(12) United States Patent
Justel et al.

(10) Patent No.: US 6,602,617 B1
(45) Date of Patent: Aug. 5, 2003

(54) PLASMA PICTURE SCREEN WITH COATED PHOSPHOR

(75) Inventors: Thomas Justel, Aachen (DE); Cornelis Ronda, Aachen (DE); Volker Weiler, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/633,759

(22) Filed: Aug. 7, 2000

(30) Foreign Application Priority Data

Aug. 7, 1999 (DE) .......................... 199 37 420

(51) Int. Cl.$^7$ .................. H05B 33/14; C09K 11/70; C09K 11/02
(52) U.S. Cl. .................. 428/690; 428/917; 313/502; 257/100; 252/301.4 P
(58) Field of Search ................. 428/690, 917; 252/301.4 P, 301.4 R; 313/509, 503, 502; 257/102, 100

(56) References Cited

U.S. PATENT DOCUMENTS

| | | | | | |
|---|---|---|---|---|---|
| 3,607,371 | A | * | 9/1971 | Haynes et al. | 117/100 B |
| 4,276,363 | A | * | 6/1981 | Manabe et al. | 430/28 |
| 5,094,185 | A | * | 3/1992 | Simopoulos et al. | 118/716 |
| 5,998,047 | A | * | 12/1999 | Bechtel et al. | 428/690 |
| 6,197,218 | B1 | * | 3/2001 | Hampden-Smith et al. | 252/301.4 R |

* cited by examiner

Primary Examiner—Cynthia H. Kelly
Assistant Examiner—Dawn Garrett
(74) Attorney, Agent, or Firm—Aaron Waxler

(57) ABSTRACT

A plasma picture screen with a phosphor preparation comprising a phosphor with a coating which comprises a phosphate $MPO_4$, wherein M is a metal chosen from the group Al, Sc, Y, Lu, Gd, and La. This coating is effective in counteracting the thermal degradation of the phosphor during the manufacture of the plasma picture screen.

4 Claims, 2 Drawing Sheets

PLASMA PICTURE SCREEN WITH COATED PHOSPHOR

BACKGROUND OF THE INVENTION

The invention relates to a plasma picture screen with a phosphor preparation comprising a phosphor with a coating.

Plasma picture screens render possible color pictures with high resolution, large screen diagonal, and have a compact construction. A plasma picture screen comprises a hermetically closed glass cell which is filled with a gas, with electrodes in a grid arrangement. The application of a voltage gives rise to a gas discharge which generates light in the ultraviolet range. This light is converted into visible light by phosphors and emitted through the front plate of the glass cell to the viewer. This process is similar to that in fluorescent tubes, but the smaller dimensions of the individual plasma discharges in a plasma picture screen render the conversion of the electrical excitation energy into visible light much less efficient than in fluorescent tubes.

The phosphors used for plasma picture screens are phosphors which are particularly efficient under UV excitation. Frequently used phosphors are, for example, $BaMgAl_{10}O_{17}$:Eu (BAM) and $(Ba,Sr,Ca)_5(PO_4)_3Cl$:Eu (SCAP), which are activated by europium in the bivalent state $Eu^{2+}$. The rigid conditions obtaining during the manufacture of the plasma picture screens, however, lead to a degradation, i.e. a decrease in the efficacy of the phosphors. Suspensions or printing pastes of the phosphors, to which organic binders and dispersing agents are added, are used for applying a phosphor to a picture screen. The organic binders improve the adhesion of the phosphors to the glass, while the dispersing agents enhance the stability of the suspensions. After the phosphor suspensions have been applied, the auxiliary substances must be removed. This is done by means of a thermal treatment at a few hundred degrees Celsius in the presence of oxygen so as to oxidize the organic compounds. Under these extreme conditions, the activator itself may also be oxidized, from $Eu^{2+}$ to $Eu^{3+}$. The presence of $Eu^{3+}$ in the phosphor particles reduces the light output, because $Eu^{3+}$ ions trap the excitons and return to the ground state without emitting radiation.

SUMMARY OF THE INVENTION

It is an object of the present invention to provide a plasma picture screen with a phosphor preparation comprising a phosphor with a coating which does not degenerate under the manufacturing conditions for plasma picture screens.

According to the invention, this object is achieved by means of a plasma picture screen with a phosphor preparation comprising a phosphor with a coating, characterized in that said coating comprises a phosphate with the formula $MPO_4$, wherein M is a metal chosen from the group Al, Sc, Y, Lu, Gd, and La.

These phosphates form particularly good, closed films with dense sines on the phosphors.

It is preferable that the phosphor in addition comprises $Eu^{2+}$ as an activator.

It is in particular the $Eu^{2+}$-containing, blue-emitting phosphors which suffer a degradation as a result of the extreme conditions which obtain during the manufacture of a plasma picture screen.

It may be preferred that the phosphor is an aluminate phosphor.

These phosphors are particularly efficient phosphors under UV or vacuum UV excitation. In addition, the surface thereof is covered with hydroxyl groups which can react with the phosphate anions of the coating material under water separation, providing a chemical bond between the coating and the phosphor. The phosphate coating as a result lies very close to the surface of the phosphors.

The invention also relates to a method of manufacturing a phosphor preparation from a phosphor with a coating of phosphates having the formula $MPO_4$, wherein M is a metal chosen from the group Al, Sc, Y, Lu, Gd, and La, in which method phosphoric acid and urea are added to an aqueous solution of a metal salt, whose metal is chosen from the group Al, Sc, Y, Lu, Gd, and La, a phosphor is added to this mixture, and the suspension is heated until the pH value has reached 7.

$MPO_4$ is slowly precipitated by means of this process, in which the pH value is slowly raised through hydrolysis of urea, and a dense and closed coating of the phosphor is obtained thereby.

The invention further relates to a phosphor preparation comprising a phosphor with a coating which comprises a phosphate with the formula $MPO_4$, wherein M is a metal chosen from the group Al, Sc, Y, Lu, Gd, and La.

This phosphor preparation may also be used as a phosphor in a device which operates with a VUV-emitting plasma such as, for example, a xenon discharge lamp.

BRIEF DESCRIPTION OF THE DRAWING

The invention will be explained in more detail below with reference to two Figures and two embodiments, wherein.

DETAILED DESCRIPTION OF THE PRIMARY EMBODIMENT

Figure 1:
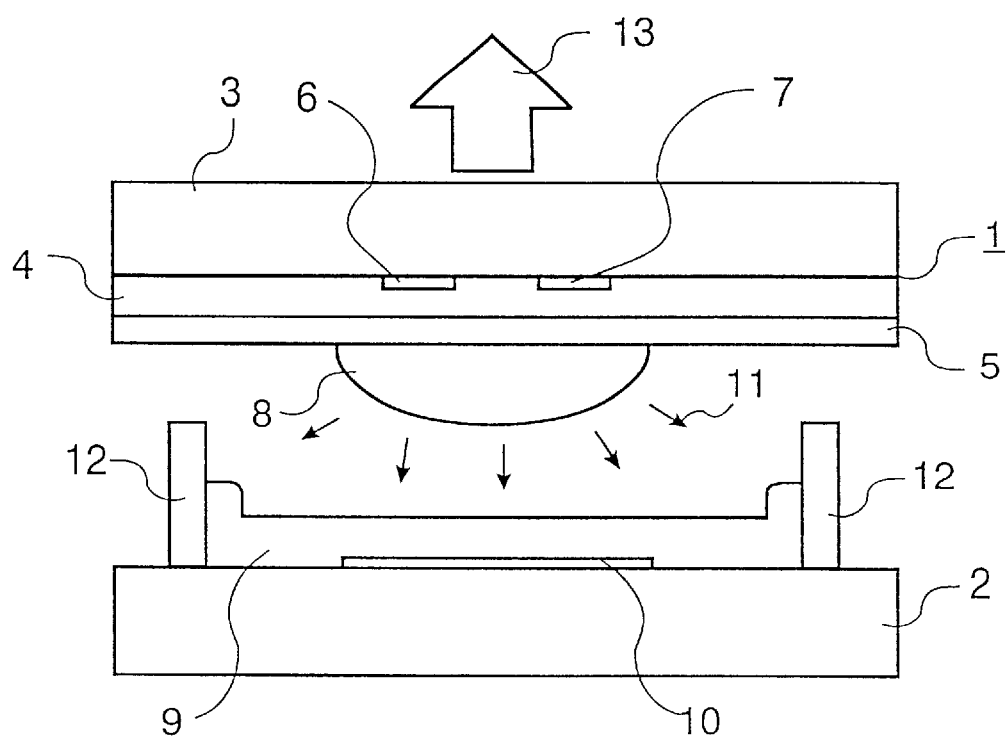
FIG. 1 shows the construction and working principle of a single plasma cell in an AC plasma picture screen, and FIG. 2 plots the light output of coated BAM before and after a thermal treatment in an atmosphere containing oxygen.

In FIG. 1, a plasma cell of an AC plasma picture screen with a coplanar construction comprises a front plate 1 and a back plate 2. The front plate 1 comprises a glass plate 3 on which a dielectric layer 4 and thereon a protective layer 5 are provided. The protective layer 5 is preferably made of MgO and the dielectric layer 4 is made of for example, PbO. Parallel, strip-shaped discharge electrodes 6, 7 are provided on the glass plate 3 such that they are covered by the dielectric layer 4. The discharge electrodes 6, 7 are made, for example, from metal or ITO. The back plate 2 is made of glass, and parallel, strip-shaped address electrodes 10, for example made of Ag, are provided on the back plate 2 so as to run perpendicularly to the discharge electrodes 6, 7. Said address electrodes are covered with phosphor layers 9 in one of the three basic colors red, green, and blue. The individual phosphor layers 9 are separated by compartment walls 12, so-called barriers, which are preferably made from a dielectric material.

A gas, preferably a rare gas mixture of, for example, He, Ne, or Kr with Xe as UV-light generating component, is present in the discharge cell, also between the discharge electrodes 6 and 7, of which one acts as the cathode and the other as the anode alternately. After the surface discharge has been ignited, which enables charges to flow along a discharge path which lies in the plasma region 8 between the discharge electrodes 6, 7, a plasma is formed in the plasma region 8 by which preferably radiation 11 in the UV range or in the VUV range is generated. This WV radiation 11 excites the phosphor 9 into phosphorescence, which emits visible light 13 in one of the three basic colors, which light issues to the exterior through the front plate 1 and thus forms a luminous pixel on the picture screen.

The $Eu^{2+}$-containing phosphors which are provided with a stabilizing coating according to the invention are, for example, $Ba_2SiO_4$:Eu, $BaMgAl_{10}O_{17}$:Eu, $(Sr,Mg)_2P_2O_7$:Eu, $Sr_4Al_{14}O_{25}$:Eu, $SrAl_2O_4$:Eu, $(Ba,Sr,Ca)_5(PO_4)_3Cl$:Eu, or $SrB_4O_7$:Eu.

The phosphors may be available as primary particles or as granulates mixed with latex and pigments. The particle size of the phosphor particles is not critical. The primary particle size of commercially available phosphors lies at approximately 2 to 20 $\mu m$. The phosphor particles are covered with a thin, uniform coating of $MPO_4$, wherein M is a metal chosen from the group Al, Sc, Y, Lu, Gd, and La The layer thickness is usually 0.001 to 0.2 $\mu m$ and is accordingly so thin that VUV photons can penetrate without appreciable energy losses.

Staring compounds used for the coating are soluble metal salts with the formula $MX_3 \cdot yH_2O$, in which M is one of the metals Al, Sc, Y, Lu, Gd, and La, X is one or several of the anions $CH_3COO^-$, $RO^-$, $NO_3^-$, $ClO_4^-$, and Cr, and y is a number greater than or equal to zero. Water is usually taken as the solvent.

Phosphoric acid, preferably 85% phosphoric acid, and urea are added to this solution. After the resulting solution has been filtered, preferably through a thin nylon filter, the phosphor powder is added. The suspension is heated under continuous stirring until the pH value of the suspension reaches the value 7. After cooling down to room temperature, the phosphor is filtered off and washed.

The coated phosphor preparations are used either "dry", i.e. as a dry powder, or "wet", i.e. as a suspension, depending on which method is used for manufacturing the plasma picture screen. In the case of a wet process, the phosphor powder need not be separated into a dry powder after the coating process, but it is further processed in the wet state. For example, a suspension is made with the coated phosphor to which the organic binder, the dispersing agent, and also a photoresist are added. This suspension is provided as a film on a back plate 2, dried, exposed through a shadow mask, and the non-exposed portions are removed by washing. To remove the washing liquid and the other additives, the back plate 2 is thermally treated under a flow of oxygen for several hours.

Subsequently, the back plate 2 together with flier components such as, for example, a front plate 1 and a mixture of rare gases is used for manufacturing an AC plasma picture screen. In principle, a coated phosphor according to the invention may also be used for other types of plasma picture screens such as, for example, plasma picture screens with a matrix arrangement or DC plasma picture screens.

Figure 2:
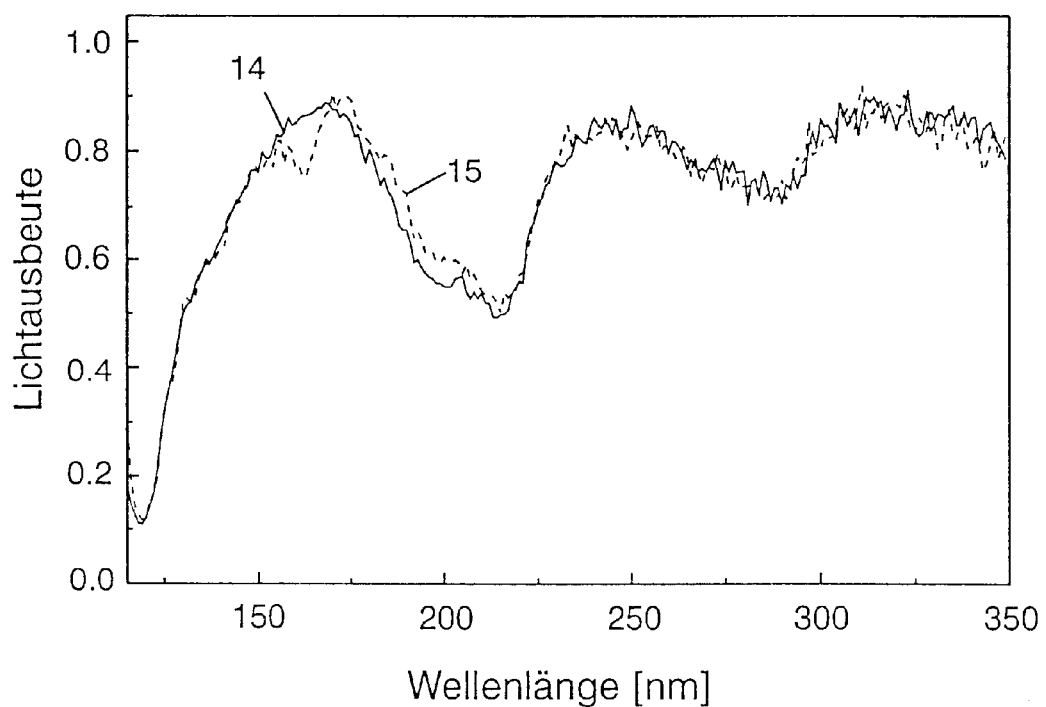

FIG. 2 shows the light output of coated $BaMgAl_{10}O_{17}$:Eu before and after a thermal treatment in an atmosphere containing oxygen. Graph 14 here represents the light output in dependence on the wavelength for $BaMg_{10}O_{17}$:Eu coated with $AlPO_4$. Graph 15 shows the light output in dependence on the wavelength of the coated phosphor after the latter has been treated thermally at 500° C. in an oxygen atmosphere for two hours. The light output has hardly changed at all after the treatment.

Embodiments of the invention will be discussed below, representing examples of how the invention may be carried into practice.

Embodiment 1

4.45 g $A(NO_3)_3 \cdot 9H_2O$ was dissolved in 1.25 l demineralized water. 1.37 g 85% $H_3PO_4$ and 36.04 g urea were added to this solution. After filtration of the resulting mixture through a 0.2 $\mu m$ nylon filter, 50 g $BaMgAl_{10}O_{17}$:Eu was added. The suspension was stirred at 90° C. until the pH value of the solution was 7. The suspension was allowed to cool down to room temperature, and the coated phosphor was filtered off, washed several times with demineralized water, and dried for one hour at 100° C.

A suspension was then prepared with the phosphor, to which additives such as an organic binder, a dispersing agent, and a photoresist were added. This suspension was provided as a film on a back plate 2, dried, irradiated through a shadow mask, and the non-irradiated portions were removed by washing. These process steps were carried out in succession for the other two phosphor types with the emission colors green and red.

All additives remaining in the phosphor layers 9 were removed by a thermal treatment of the back plate 2 at 600° C. in an oxygen atmosphere. Such a back plate 2 was then used for manufacturing a plasma picture screen.

Embodiment 2

4.45 g $Al(NO_3)_3 \cdot 9H_2O$ was dissolved in 1.25 l demineralized water. 1.37 g 85% $H_3PO_4$ and 36.04 g urea were added to this solution. After filtration of the resulting solution through a 0.2 $\mu m$ nylon filter, 50 g $(Ba,Sr,Ca)_5(PO_4)_3Cl$:Eu was added. The suspension was stirred at 90° C. until the pH value of the solution was 7. The suspension was allowed to cool down to room temperature. The coated phosphor was filtered off, washed several times with demineralized water, and dried for one hour at 100° C.

A suspension was then prepared with the phosphor, to which additives such as an organic binder, a dispersing agent, and a photoresist were added. This suspension was provided as a film on a back plate 2, dried, irradiated through a shadow mask, and the non-irradiated portions were removed by washing. These process steps were carried out in succession for the other two phosphor types with the emission colors green and red.

All additives remaining in the phosphor layers 9 were removed by a thermal treatment of the back plate 2 at 600° C. in an oxygen atmosphere. Such a back plate 2 was then used for manufacturing a plasma picture screen.

What is claimed is:
1. A plasma picture screen with a phosphor preparation comprising a phosphor with a coating, wherein said coating has a phosphate with the formula $MPO_4$, wherein M is a metal chosen from the group consisting of Al, Sc, Y, Lu, Gd, and La, and wherein the surface of the phosphor is covered with hydroxyl groups which provide a chemical bond between the coating and the phosphor.
2. A plasma picture screen as claimed in claim 1, wherein the phosphor comprises $Eu^{2+}$ as an activator.
3. A plasma picture screen as claimed in claim 1, wherein the phosphor is an aluminate phosphor.
4. A plasma picture screen as claimed in claim 1, wherein the chemical bond between the coating and the phosphor is provided by the hydroxyl groups reacting with phosphate anions of the coating under water separation.

\* \* \* \* \*